United States Patent [19]

Hoefer

[11] 4,256,350

[45] Mar. 17, 1981

[54] FLUID CONTROL CIRCUIT FOR BRAKES AND THE LIKE

[75] Inventor: Wayne A. Hoefer, Blue Springs, Mo.

[73] Assignee: Caterpillar Tractor Co., Peoria, Ill.

[21] Appl. No.: 118,034

[22] PCT Filed: Aug. 13, 1979

[86] PCT No.: PCT/US79/00598

§ 371 Date: Aug. 13, 1979

§ 102(e) Date: Aug. 13, 1979

[51] Int. Cl.³ .............................................. B60T 13/00
[52] U.S. Cl. .................................. 303/6 M; 188/170; 303/10; 303/50; 303/52; 303/71
[58] Field of Search ........................... 303/6 M, 50–56, 303/10, 9, 13, 71; 188/170; 60/547, 548; 91/469, 31, 32, 431, 450; 192/4 A, 4 B, 13 R

[56] References Cited

U.S. PATENT DOCUMENTS

| | | | |
|---|---|---|---|
| 3,216,769 | 11/1965 | Hicks et al. | 303/6 |
| 3,259,216 | 7/1966 | Klaus et al. | 188/170 X |
| 3,401,982 | 9/1968 | Walker et al. | 303/10 X |
| 3,423,136 | 1/1969 | Lohbauer | 303/54 |
| 3,528,707 | 9/1970 | Casey | 303/10 |
| 3,793,829 | 2/1974 | Swanson | 60/547 |
| 3,815,697 | 6/1974 | Bridwell et al. | 192/4 A X |
| 3,854,559 | 12/1974 | Talak et al. | 192/4 A |
| 3,917,037 | 11/1975 | Prillinger | 188/170 |
| 3,918,765 | 11/1975 | Hayashida | 303/6 R |
| 3,976,333 | 8/1976 | Fillion et al. | 188/170 X |
| 4,037,878 | 7/1977 | Zyduck | 303/13 |
| 4,059,042 | 11/1977 | Bridwell et al. | 91/469 |
| 4,072,360 | 2/1978 | Carroll et al. | 188/170 X |
| 4,076,329 | 2/1978 | Johnson et al. | 303/50 X |

Primary Examiner—Douglas C. Butler
Attorney, Agent, or Firm—Phillips, Moore, Weissenberger, Lempio & Majestic

[57] ABSTRACT

Conventional fluid control circuits for brakes and the like normally comprise a control valve interconnected between a pressurized fluid source and the brakes for selectively actuating the same. A problem arises in that upon starting of the vehicle during cold weather conditions, the hydraulic fluid is not sufficiently warm to ensure efficient brake operation. This invention includes conduits (36) for sequentially communicating fluid from a fluid source (11), through an actuating chamber (14) of a brake (15), and to a control valve (25) in series when the brake (15) is either in its disengaged or engaged condition of operation. Furthermore, upon actuation of the valve (25), an operator is enabled to detect by "feel" the degree of brake engagement.

19 Claims, 3 Drawing Figures

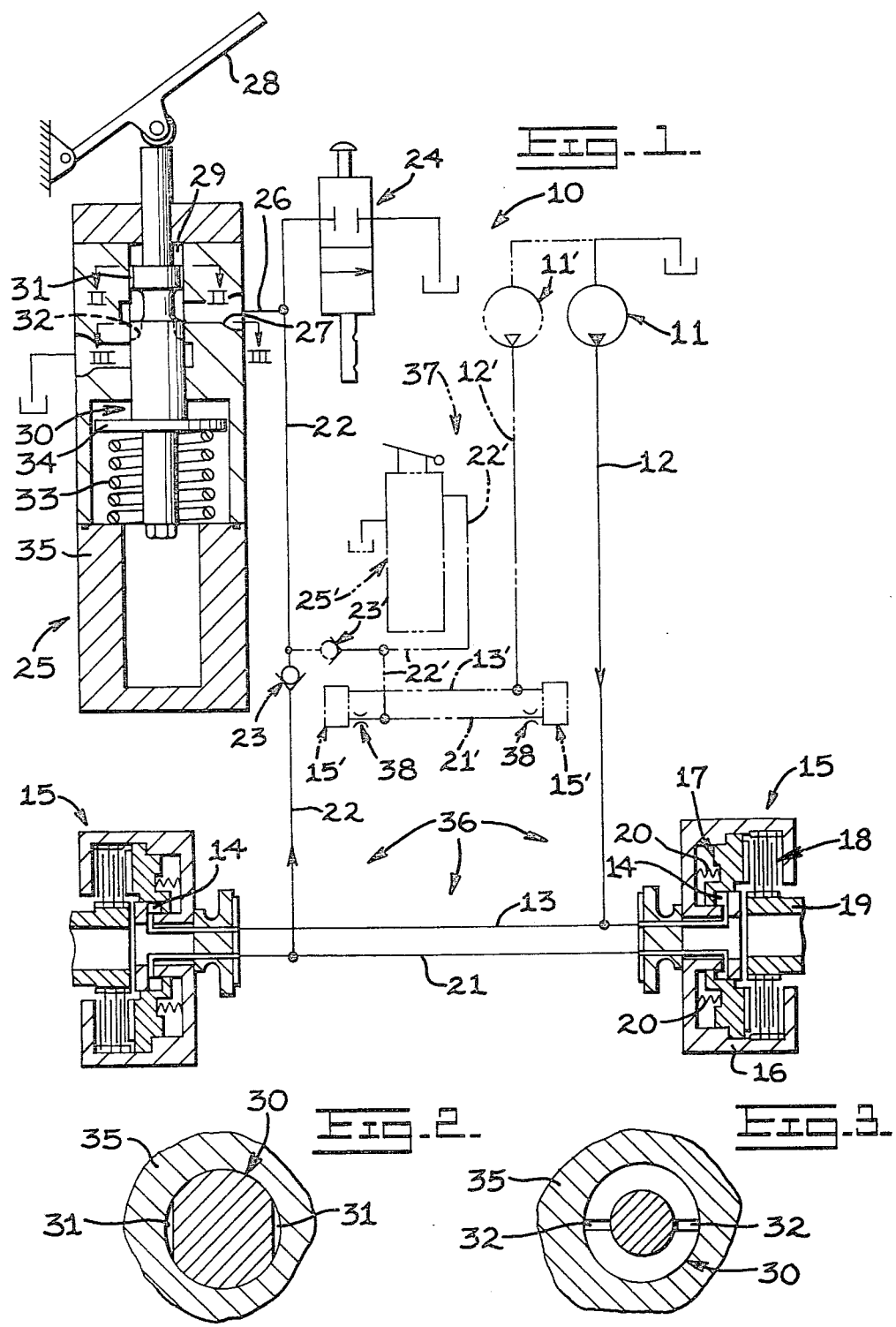

FLUID CONTROL CIRCUIT FOR BRAKES AND THE LIKE

DESCRIPTION

1. Technical Field

This invention relates to a fluid control circuit for controlling the actuation of a fluid-actuated coupling, such as a normally engaged brake.

2. Background Art

Fluid control circuits for controlling the release of service brakes, employed on construction vehicles and the like, normally include a directional control valve interconnected between an engine-driven pump and actuating chambers of the brakes. The brakes are either of the normally "on" or "off" type whereby the spring-biased brakes are engaged or released upon communication of pressurized hydraulic fluid thereto, as the case may be.

In either type of braking system, when the hydraulic fluid utilized to actuate the brakes is in a relatively cold state, proper actuation of the brakes may be inhibited. This phenomenon, wherein the viscosity and flow characteristics of hydraulic fluids are directly proportional to the fluids temperature, is well known in the art. This problem has been partially solved by providing a control valve, interconnected between a pump and a clutch or brake cylinder, with means for circulating hydraulic fluid through the control valve and to tank when fluid is not being delivered to the cylinder.

In addition, conventional braking systems do not always provide the operator with the desired "pedal feel" or feedback to alert him regarding the degree of braking force being applied to the vehicle. One solution to this latter problem has been the provision of a plurality of springs, having different spring rates, against which the operator applies his braking input. Although this type of braking system provides the operator with a certain degree of "pedal feel" it will be appreciated that such a system has drawbacks, such as the requirement to calibrate precisely the springs for brake engagement purposes.

DISCLOSURE OF THE INVENTION

The present invention is directed to overcoming one or more of the problems as set forth above.

In one aspect of this invention, a fluid control circuit comprises pump means, fluid-actuated coupling means for being selectively placed in a disengaged or engaged condition of operation, and valve means for selectively engaging the coupling means. The improvement in the control circuit comprises means for sequentially communicating fluid from the pump means, through an actuating chamber of the coupling means, and to the valve means in series when the coupling means is in both its disengaged and engaged conditions of operation. Continuous circulation of fluid (hydraulic) through the actuating chamber of the coupling means conditions the fluid for efficient operation of the control circuit, particularly when cold ambient conditions prevail.

In another aspect of this invention, the valve means includes first means for applying fluid pressure to a spool thereof to urge it against the counteracting force of a biasing means and second means for selectively reducing such fluid pressure in proportion to movement of the spool. An operator will thus be provided with "pedal feel" to sense the degree of engagement of the coupling means.

BRIEF DESCRIPTION OF THE DRAWINGS

Other objects and advantages of this invention will become apparent from the following description and accompanying drawings wherein:

FIG. 1 schematically illustrates a fluid control circuit embodiment of the present invention for selectively actuating service brakes of a vehicle; and FIGS. 2 and 3 are enlarged cross sectional views through a pressure modulating relief valve employed in the fluid control circuit.

BEST MODE OF CARRYING OUT THE INVENTION

FIG. 1 schematically illustrates a fluid control circuit 10 comprising an engine-driven pump 11 for discharging pressurized fluid (hydraulic) therefrom in a conventional manner. A line 12 connects to a line 13 for communicating fluid to annular actuating chambers 14 of a pair of fluid actuated coupling means 15, each shown in the form of a service brake. Although this invention is particularly adapted for application to service brakes of this type, it will be appreciated by those skilled in the art that other types of applications can be made, such as the utilization of fluid actuated couplings (brakes or clutches) in fluid control circuits for power shift transmissions or the like.

Each coupling or service brake 15 comprises a stationary housing 16 having a piston and pressure plate 17 reciprocally mounted therein. Such reciprocal movement will function to selectively compress a plurality of interleaved friction discs 18, alternately splined on a fixed housing 16 and a rotating member 19. Output member 19 may be suitably connected to a ground-engaging wheel of a vehicle, through a final wheel drive assembly, in a conventional manner.

Each brake 15 is preferably of the normally engaged type wherein a plurality of compression coil springs 20 urge piston and pressure plate 17 axially towards friction discs 18 to compress them together, upon venting of chamber 14, whereby rotation of member 19 is prevented. In FIG. 1, brake 15 is shown in its disengaged condition of operation whereby pressurized fluid in chamber 14 functions to move piston and pressure plate 17 away from friction discs 18, to permit member 19 to rotate relative to housing 16.

Line 13, receiving pressurized fluid from pump 11, further communicates with a line 21, via chambers 14 of brakes 15, and thus with a line 22. The pressurized fluid in line 22 passes through a check valve 23 therein to communicate the fluid to a two-position parking and emergency brake valve 24 and to a pressure modulating relief valve 25. In the illustrated position of valve 24, the valve blocks direct communication of the fluid to tank to thus condition brakes for their disengagement. A branch line 26 communicates the fluid from line 22 to an inlet 27 of valve 25 which is adapted to be selectively actuated during vehicle operation by an operator-controlled pedal 28 to selectively control the engagement of brakes 15.

Should the line pressure communicated to inlet 27 exceed a predetermined level, such as 3,000 kPa, fluid pressure communicated to a boost chamber 29 will function automatically to move a spool 30 of valve 25 downwardly to relieve such excess pressure to tank. Fluid pressure is continuously communicated to chamber 29 via a pair of passages 31 (FIG. 2), defined in part by flats formed on spool 30. Downward movement of spool 30 will at least partially uncover a plurality of calibrated modulating slots 32 (FIG. 3) to communicate inlet 27 and chamber 29 with tank directly.

Valve 25 further includes a compression coil spring 33 which engages a washer 34 secured on spool 30 to urge spool 30 and thus pedal 28 upwardly in FIG. 1, against the counteracting force of any fluid pressure prevalent in chamber 29. Spool 39 is reciprocally mounted in a housing 35 which may be mounted at a convenient location in a cab of a vehicle. During oeration of the vehicle, the operator is enabled to depress pedal 28 to closely modulate and control the desired engagement of brakes 15 by the degree of opening of metering slots 32 in response to depression of the pedal. Valve 25 thus functions as a pressure limiting valve when no operator input is applied to pedal 28 and further functions to selectively vent chambers 14 for brake engagement purposes upon depression of pedal 28 by the operator.

It should be further noted in FIG. 1 that conduits 12, 13, 21 and 22 comprise means 36 for sequentially communicating pressurized fluid from pump 11, through chambers 14 of brakes 15, and to valve 25 in series when the brakes are both in their disengaged and engaged conditions of operation. In this regard, when valve 24 is moved upwardly to communicate line 22 with tank, brakes 15 are fully engaged and valve 25 is rendered inoperative. The continuous circulation of fluid through circuit 10 will thus maintain the hydraulic fluid in a warm and readied condition for the efficient engagement of brakes 15, when needed.

INDUSTRIAL APPLICABILITY

Fluid control circuit 10 finds particular application to braking systems wherein it is desired to ensure continuous circulation of hydraulic fluid through actuating chambers 14 of brakes 15 upon running of the engine. In addition, pressure modulating relief valve 25 will provide the dual functions of maintaining system pressures below a predetermined level (e.g., 3,000 kPa) when no operator input is provided at pedal 28 and of permitting the operator to selectively engage brakes 15. The latter function further provides the operator with a sense of "pedal feel" to indicate the degree of braking force being applied to brakes 15. Valve 25 may be used in association with parking and emergency brake valve 24 to control the service brakes of the vehicle.

A secondary fluid control circuit 37, including a second pressure modulating relief valve, may be integrated into primary control circuit 10 to provide a retarding function during vehicle operation. In particular, fluid control circuit 37 is adapted to selectively retard brakes 15', identical in construction to brakes 15. For example, brakes 15 may be employed in association with the scraper portion of a tractor-scraper, whereas brakes 15' may be employed on the tractor portion thereof. A separate pump 11' is shown in control circuit 37 to supply pressurized hydraulic fluid to brakes 15' and valve 25'.

In operation and assuming that the vehicle is at rest with parking and emergency brake 24 moved upwardly to its open or vent position communicating line 22 with tank, running of the engine will drive pumps 11 and 11' to continuously circulate hydraulic fluid through the circuit, including actuating chambers 14 of brakes 15 and 15'. Spring 33 of valve 25 will function to move spool 30 upwardly from its position shown in FIG. 1 to fully block communication of inlet port 27 with tank via slots 32.

Downward movement of valve 24 to its operative position illustrated in FIG. 1 to release brakes 15 and 15', will block direct communication of line 22 with tank and will permit pressurization of chamber 29, via passages 31, to move spool 30 downwardly against the opposing force of spring 33 and to its pressure regulating position illustrated. Should the fluid pressure in the control circuit, as reflected at inlet 27 of valve 25, exceed a predetermined level e.g., 3,000 kPa) the increased fluid pressure in chamber 29 will automatically move spool 30 downwardly to at least partially unmask slots 32 to vent the excess fluid pressure therethrough. Valve 25' functions in a similar manner.

This continuous pressure regulating function will ensure that hydraulic fluid is continuously circulated through the fluid control circuits 10 and 37 to maintain the temperature and viscosity of the fluid at sufficient levels to ensure efficient actuation of brakes 15 and 15'. It should be understood that the brakes may be of the oil-cooled type wherein metered portions of the hydraulic fluid supplied thereto is communicated to friction discs 18 and attendant components of the brakes to maintain them in a cooled condition of operation.

With parking and emergency brake valve 24 being maintained in its FIG. 1 closed position, chambers 14 of brakes 15 and 15' will be pressurized to release the brakes. In particular, pump 11 will communicate hydraulic fluid to chambers 14 of brakes 15, via lines 12 and 13, and the fluid will then communicate with inlet 27 to valve 25, via lines 21, 22 and 26. Likewise, pump 11' communicates pressurized fluid to the actuating chambers of brakes 15' to relese them, via lines 12' and 13', and the fluid then flows to valve 25' via lines 21' and 22'.

Upon depression of the accelerator pedal (not shown) by the operator to move the vehicle, the operator will encounter situations wherein it is desirable to at least partially engage brakes 15 and 15' simultaneously. This braking of the service brakes is accomplished by depressing pedal 28 to unmask metering slots 32 whereby the fluid pressure in lines 22 and 22' will be reduced to engage brakes 15 and 15'.

It should be noted that an orifice 38 may be placed at each end of line 21' to delay depressurization of the actuating chambers of brakes 15' to enable the rear brakes 15 of the scraper portion of the vehicle to engage prior to engagement of front brakes 15' of the tractor portion thereof. This sequence of brake application ensures controlled braking and avoids any abrupt stopping or jack-knifing of the vehicle.

Upon depression of pedal 28, the pressure level in chamber 29 will reduce, via slots 31 and 32, whereby the operator input will be resisted substantially solely by the counteracting force of spring 33. The operator is thus enabled to "feel" the increasing resistance to pedal effort and thus the degree of braking imposed on brakes 15 and 15'. Continued depression of pedal 28 will, of course, fully engage the brakes.

During operation of the vehicle the operator may find it advantageous to soley engage brakes 15' of the tractor portion of the vehicle. This retarding function is accomplished by actuating only valve 25' to vent pressurized fluid from line 22' to tank. If so desired, parking and emergency brake valve 24 could be eliminated from the control circuit and valve 25' could be utilized as the parking and emergency brake valve as well as the retarding valve to selectively engage brakes 15' in the manner described above.

Another advantage inherent in the addition of secondary control circuit 37 is that a line failure in either primary circuit 10 or secondary circuit 37 will not engage all four brakes 15 and 15' simultaneously to thus avoid an abrupt stopping of the vehicle. For example, should a break occur in line 21, only brakes 15 would be applied initially to avoid any abrupt stopping of the vehicle.

Other aspects, objects and advantages of this invention can be obtained from a study of the drawings, the disclosure and the appended claims.

I claim:

1. In a fluid control circuit (10) comprising pump means (11) for discharging pressurized fluid therefrom, fluid-actuated coupling means (15), having an actuating chamber (14), for being selectively placed in a disengaged or engaged condition of operation, and valve means (25) for selectively controlling the engagement of said coupling means (15), the improvement comprising means (36) for continuously communicating fluid from said pump means (11), through the chamber (14) of said coupling means (15), and to said valve means (25) in series when said coupling means (15) is in both its disengaged and engaged conditions of operation.

2. The control circuit of claim 1 wherein said coupling means (15) is normally engaged upon pressurization of the actuating chamber (14) thereof and is disengaged upon reduction of fluid pressure in said actuating chamber (14).

3. The control circuit of claim 2 wherein said coupling means (15) constitutes a brake (15).

4. The control circuit of claim 2 further including a second valve means (24) for actuation between a first position venting pressurized fluid from said actuating chamber (14) and a second position for permitting pressurization of said actuating chamber (14) and disengagement of said coupling means (15).

5. The control circuit of claim 1 wherein said valve means (25) includes a spool means (30) for reciprocal movement between first and second positions, biasing means (33) for urging said spool means (30) towards its first position under a predetermined force, first means (29,31) for applying fluid pressure to said spool means (30) to urge it towards its second position and against the force of said spring means (33), and second means (32) for reducing such fluid pressure in proportion to the extent of movement of said spool means (30) from its first position towards its second position to indicate the degree of engagement of said coupling means (15).

6. The control circuit of claim 5 wherein said valve means (35) further includes a housing (35) having said spool means (30) reciprocally mounted therein and wherein said first means (29) includes a boost chamber (29) defined between said spool means (30) and said housing (35) and at least one passage (31) defined between said spool means (30) and said housing (35) for communicating pressurized fluid from said actuating chamber (14) to said boost chamber (29).

7. The control circuit of claim 6 wherein said second means (32) includes at least one metering slot (32) defined on said spool means (30).

8. The control circuit of claim 1 further comprising a second (15') coupling means for being selectively placed in a disengaged or engaged condition of operation and a second (25') valve means for selectively controlling the engagement of said second coupling means (15').

9. The control circuit of claim 8 wherein a pair of said first-mentioned coupling means (15) have actuating chambers (14) thereof interconnected together (at 13) for receiving pressurized fluid from said pump means (11) and wherein a pair of said second coupling means (15') have actuating chambers thereof interconnected (at 13') for receiving pressurized fluid from a second pump means (11').

10. The control circuit of claim 9 further including additional valve means (24) for actuation between a first position venting pressurized fluid from the actuating chambers (14) of each of said first and secnd coupling means (15,15') and a second position for permitting pressurization of said actuating chambers (14) and disengagement of each of said coupling means (15,15').

11. In a fluid control circuit (10) comprising pump means (11) for discharging pressurized fluid therefrom, fluid-actuated coupling means (15) for being selectively placed in a disengaged or engaged condition of operation, and valve means (25) for selectively controlling the engagement of said coupling means (15), including a spool means (30) for reciprocal movement between first and second positions and biasing means (33) for urging said spool means (30) towards its first position under a predetermined force, the improvement comprising said valve means (25) further including first means (29,31) for applying fluid pressure to said spool means (30) to urge it towards its second position and against the force of said biasing means (33), and second means (32) for selectively reducing such fluid pressure in proportion to the extent of movement of said spool means (30) from its first position towards its second position to indicate the degree of engagement of said coupling means (15).

12. The control circuit of claim 11 wherein said coupling means (15) is normally engaged upon pressurization of the actuating chamber (14) thereof and is disengaged upon reduction of fluid pressure in said actuating chamber (14).

13. The control circuit of claim 12 wherein said coupling means (15) constitutes a brake (15).

14. The control circuit of claim 12 further including a second valve means (24) for actuation between a first position venting pressurized fluid from said actuating chamber (14) and a second position for permitting pressurization of said actuating chamber (14) and disengagement of said coupling means (15).

15. The control circuit of claim 11 wherein said valve means (25) further includes a housing (35) having said spool means (30) reciprocally mounted therein and wherein said first means (29) includes a boost chamber (29) defined between said spool means (30) and said housing (35) and at least one passage (31) defined between said spool means (30) and said housing (35) for communicating pressurized fluid from said actuating chamber (14) to said boost chamber (29).

16. The control circuit of claim 15 wherein said second means (32) includes at least one metering slot (32) defined on said spool means (30).

17. The control circuit of claim 11 further comprising a second (15') coupling means for being selectively placed in a disengaged or engaged condition of operation and a second (25') valve means for selectively controlling the engagement of said second coupling means (15').

18. The control circuit of claim 17 wherein a pair of said first-mentioned coupling means (15) have actuating chambers (14) thereof interconnected together (at 13) for receiving pressurized fluid from said pump means (11) and wherein a pair of said second coupling means (15') have actuating chambers thereof interconnected (at 13') for receiving pressurized fluid from a second pump means (11').

19. The control circuit of claim 18 further including additional valve means (24) for actuation between a first position venting pressurized fluid from the actuating chambers (14) of each of said first and second coupling means (15,15') and a second position for permitting pressurization of said actuating chambers (14) and disengagement of each of said coupling means (15,15').

* * * * *